United States Patent [19]

Moini

[11] Patent Number: 5,332,566

[45] Date of Patent: Jul. 26, 1994

[54] SYNTHESIS OF CRYSTALLINE ZSM-23

[75] Inventor: Ahmad Moini, Lawrenceville, N.J.

[73] Assignee: Mobil Oil Corp., Fairfax, Va.

[21] Appl. No.: 92,093

[22] Filed: Jul. 16, 1993

[51] Int. Cl.$^5$ .................. C01B 33/34; B01J 29/28
[52] U.S. Cl. .................... 423/705; 423/704; 423/709; 423/718; 423/DIG. 36
[58] Field of Search ............ 423/701, 702, 704, 705, 423/709, 718, DIG. 30; 502/62, 71, 77

[56] References Cited

U.S. PATENT DOCUMENTS

| | | | |
|---|---|---|---|
| 4,076,842 | 2/1978 | Plank et al. | 423/704 |
| 4,296,083 | 10/1981 | Rollmann | 423/708 |
| 4,404,175 | 9/1983 | Marosi et al. | 423/705 X |
| 4,423,021 | 12/1983 | Roumann et al. | 423/708 |
| 4,490,342 | 12/1984 | Valyocsik | 423/708 |
| 4,531,012 | 7/1985 | Valyocsik | 564/295 |
| 4,537,754 | 8/1985 | Casci et al. | 423/708 |
| 4,537,757 | 8/1985 | Chono et al. | 423/705 |
| 4,551,321 | 11/1985 | Marosi et al. | 423/708 |
| 4,585,638 | 4/1986 | Kuhl | 423/708 |
| 4,585,639 | 4/1986 | Szostak | 423/707 |
| 4,619,820 | 10/1986 | Valyocsik | 423/708 |
| 4,623,527 | 11/1986 | Derouane et al. | 423/713 |
| 4,632,815 | 12/1986 | Valyocsik | 423/328.2 |
| 4,637,923 | 1/1987 | Szostak | 423/708 |
| 4,665,250 | 5/1987 | Chu et al. | 585/415 |
| 4,683,214 | 7/1987 | Angevine et al. | 502/66 |
| 4,721,609 | 1/1988 | Baacke et al. | 502/77 X |
| 5,187,132 | 2/1993 | Zones et al. | 502/64 |

FOREIGN PATENT DOCUMENTS

| | | |
|---|---|---|
| 0051318 | 5/1982 | European Pat. Off. |
| 0377291 | 7/1990 | European Pat. Off. |
| 2190910 | 12/1987 | United Kingdom |
| 2202838 | 10/1988 | United Kingdom |

OTHER PUBLICATIONS

Lok, B. M. et al., "The role of organic molecules in molecular sieve synthesis", Zeolites, 3, 282–291 (1983).

*Primary Examiner*—Karl Group
*Assistant Examiner*—David R. Sample
*Attorney, Agent, or Firm*—Alexander J. McKillop; Malcolm D. Keen; Dennis P. Santini

[57] ABSTRACT

This invention relates to a new form of crystalline material identified as having the structure of ZSM-23, to a new and useful method for synthesizing said crystalline material and to use of said crystalline material prepared in accordance herewith as a catalyst for organic compound, e.g., hydrocarbon compound, conversion.

17 Claims, 1 Drawing Sheet

SYNTHESIS OF CRYSTALLINE ZSM-23

BACKGROUND OF THE INVENTION

1. Field of the Invention

This invention relates to a new and useful method for synthesizing a highly useful form of crystalline material identified as having a ZSM-23 structure, the new ZSM-23 synthesized, and use of the crystalline material synthesized in accordance herewith as a catalyst component for organic compound, e.g., hydrocarbon compound, conversion.

More particularly, this invention relates to a method for preparing the crystalline ZSM-23 structure whereby synthesis is facilitated and reproducible and the product exhibits high purity and catalytic utility.

2. Discussion of the Prior Art

ZSM-23 contains one-dimensional pores made up of 10-membered rings. It is shown to be synthesized from reaction mixtures containing pyrrolidine directing agent in U.S. Pat. No. 4,076,842; and diisopropanolamine directing agent in Great Britain Patent Application 2,190,910. U.S. Pat. Nos. 4,490,342; 4,531,012 and 4,619,820 show synthesis of ZSM-23 from reaction mixtures containing "Diquat-7" directing agent. Diquat-7 is a diquaternary ammonium compound having the formula: $(CH_3)_3N^+RN^+(CH_3)_3$, wherein R is a saturated or unsaturated straight chain hydrocarbon group having seven carbon atoms. Diquat-8 is said in U.K. Patent Application 2,202,838 to direct ZSM-23 synthesis.

The above disclosures are incorporated herein by reference as to ZSM-23 and its synthesis.

Various organic directing agents are taught for synthesis of various crystalline materials. For example, U.S. Pat. No. 4,139,600 teaches a method for synthesis of zeolite ZSM-5 from a reaction mixture comprising, as a directing agent, an alkyldiamine. U.S. Pat. No. 4,296,083 claims synthesizing zeolites characterized by a Constraint Index of 1 to 12 and an alumina/silica mole ratio of not greater than 0.083 from a specified reaction mixture containing an organic nitrogen-containing cation provided by an amine identified as being selected from the group consisting of triethylamine, trimethylamine, tripropylamine, ethylenediamine, propanediamine, butanediamine, pentanediamine, hexanediamine, methylamine, ethylamine, propylamine, butylamine, dimethylamine, diethylamine, dipropylamine, benzylamine, aniline, pyridine, piperidine and pyrrolidine.

Piperidine is disclosed as an organic directing agent for mordenite synthesis by P. A. Jacobs and J. A. Martens, *Studies of Surface Science and Catalysis*, 33, 12 (1987); and 2-amino-pyridine is taught for this purpose in U.S. Pat. No. 4,390,457. Tetra-n-propylammonium salts are taught to be mordenite directing agents in U.S. Pat. Nos. 4,707,345 and 4,788,380.

U.S. Pat. No. 4,151,189 claims a method for synthesizing zeolites ZSM-5, ZSM-12, ZSM-35 and ZSM-38 containing an organic nitrogen cation from a specified reaction mixture containing a primary amine having 2 to 9 carbon atoms as a directing agent. U.S. Pat. No. 4,341,748 shows synthesis of ZSM-5 structure from reaction mixtures comprising ethanol, ZSM-5 seeds, ethanol and seeds, ethanol and ammonium hydroxide, and ethanol, ammonium hydroxide and ZSM-5 seeds. U.S. Pat. No. 4,100,262 teaches synthesis of ZSM-5 from a reaction mixture comprising a tetraalkylammonium source and a tetraureacobalt (II) complex.

Lok et al. (3 *Zeolites*, 282–291 (1983)) teach numerous organic compounds which act as directing agents for synthesis of various crystalline materials, such as, for example, ZSM-5, ZSM-11, ZSM-12, ZSM-20, ZSM-35, ZSM-48, ALPO$_4$-5, ALPO$_4$-8, ALPO$_4$-20 and others. The article does not show the presently required organic for synthesis of ZSM-23.

The zeolitic composition labeled PSH-3 in U.S. Pat. No. 4,439,409 is synthesized from reaction mixtures containing hexamethyleneimine as directing agent. U.S. Pat. No. 4,954,325 utilizes hexamethyleneimine in another reaction mixture to direct synthesis of MCM-22. That organic is used in U.S. Pat. No. 4,981,663 for synthesis of yet another crystalline structure labelled MCM-35. ZSM-35 is directed by this same compound in U.S. Pat. No. 4,925,548.

Other publications teaching various organic directing agents for synthesis of various crystalline materials include, for example, U.S. Pat. No. 4,592,902, teaching use of an alkyltropinium directing agent, alkyl being of 2 to 5 carbon atoms, for synthesis of ZSM-5; U.S. Pat. No. 4,640,829, teaching use of dibenzyldimethylammonium directing agent for synthesis of ZSM-50; U.S. Pat. No. 4,637,923, teaching use of $(CH_3)_2(C_2H_5)N^+(CH_2)_4N^+(C_2H_5)(CH_3)_2$ directing agent for synthesis of another novel zeolite; U.S. Pat. No. 4,585,747, teaching use of bis (N-methylpyridyl) ethylinium directing agent for synthesis of ZSM-48; U.S. Pat. No. 4,585,746, teaching use of bis (N-methylpyridyl) ethylinium directing agent for synthesis of ZSM-12; U.S. Pat. No. 4,584,286, mentioned above, teaching use of bis (N-methylpyridyl) ethylinium directing agent for synthesis of ZSM-35; U.S. Pat. No. 4,568,654, teaching use of cobalticinium, dimethylpiperidinium, trimethylene bis trimethylammonium or tetramethylpiperazinium directing agents for synthesis of ZSM-51; U.S. Pat. No. 4,559,213, teaching use of DABCO-C$_{4-10}$-diquat directing agent for synthesis of ZSM-12; U.S. Pat. No. 4,482,531, teaching synthesis of ZSM-12 with a DABCO-C$_n$-diquat, n being 4,5,6 or 10, directing agent; and U.S. Pat. No. 4,539,193, teaching use of bis (dimethylpiperidinium) trimethylene directing agent for synthesis of ZSM-12.

Various diquaternary ammonium compounds have been identified as directing agents for a particular assortment of other crystalline materials. For instance, U.S. Pat. No. 4,665,250 teaches the use of linear diquaternary ammonium compounds of the structure $(CH_3)_3N^+(CH_2)_mN^+(CH_3)_3$, m being 5, 6, 8, 9 or 10, for synthesis of ZSM-48.

U.S. Pat. No. 4,623,527 teaches numerous diquaternary ammonium compounds and shows use of $(CH_3)_3N^+(CH_2)_7N^+(CH_3)_3$ directing agent for synthesis of MCM-10. European Patent Application 377,291 teaches use of Diquat-n, n being 8–12, to direct synthesis of zeolite NU-87. U.S. Pat. No. 4,632,815 teaches numerous diquaternary ammonium compounds and shows use of $(CH_3)_3N^+(CH_2)_4N^+(CH_3)_3$ to direct synthesis of a Silica-X structure type. U.S. Pat. No. 4,585,639 teaches use of the diquaternary $(C_2H_5)(CH_3)_2N^+(CH_2)_{4 or 6}N^+(CH_3)_2(C_2H_5)$ as directing agent for synthesis of ZSM-12. Synthesis of ZSM-5 is directed by the diquaternary $(alkyl)_3N^+(CH_2)_6N^+(alkyl)_3$, alkyl being propyl or butyl, in U.S. Pat. No. 4,585,638.

EPA 42,226 and U.S. Pat. No. 4,537,754 teach existence of numerous diquaternary ammonium compounds, but show use of $(CH_3)_3N^+(CH_2)_6N^+(CH_3)_3$ as directing agent for synthesis of EU-1. EPA 51,318 teaches use of the same diquaternary for synthesis of TPZ-3. It is noted that EU-1, TPZ-3 and ZSM-50 (synthesized with dibenzyldimethylammonium directing agent) have the same structure.

Applicants know of no prior art method for preparing a crystalline structure identified as ZSM-23 utilizing the present method.

SUMMARY OF THE INVENTION

An economical and reproducible method for preparing a crystalline material identified as ZSM-23 exhibiting high catalytic activity and other valuable properties is provided. The method comprises forming a reaction mixture hydrogel containing sources of alkali or alkaline earth metal (M) cations, e.g., $K^+$ and/or $Na^+$; an oxide of trivalent element (X), e.g., aluminum, boron, iron, gallium, indium and mixtures thereof; an oxide of tetravalent element (Y), e.g., silicon, germanium, tin and mixtures thereof; a specific organic directing agent (R), more particularly described hereinafter; and water, said reaction mixture having a composition in terms of mole ratios, within the following ranges:

| Reactants | Useful | Preferred |
|---|---|---|
| $YO_2/X_2O_3$ | 30 to 300 | 45 to 200 |
| $H_2O/YO_2$ | 20 to 100 | 40 to 70 |
| $OH^-/YO_2$ | 0.1 to 0.4 | 0.25 to 0.35 |
| $M/YO_2$ | 0.05 to 1.0 | 0.2 to 0.6 |
| $R/YO_2$ | 0.02 to 1.0 | 0.05 to 0.15 |

The method further comprises maintaining the reaction mixture until crystals of ZSM-23 structure are formed. Reaction conditions required consist of heating the foregoing reaction mixture to a temperature of from about 150° C. to about 190° C. for a period of time of from about 20 hours to about 10 days. A more preferred temperature range is from about 160° C. to about 180° C. with the amount of time at a temperature in such range being from about 2 days to about 5 days. The solid product comprising ZSM-23 crystals is recovered from the reaction medium, as by cooling the whole to room temperature, filtering and water washing.

EMBODIMENTS

Figure 1:
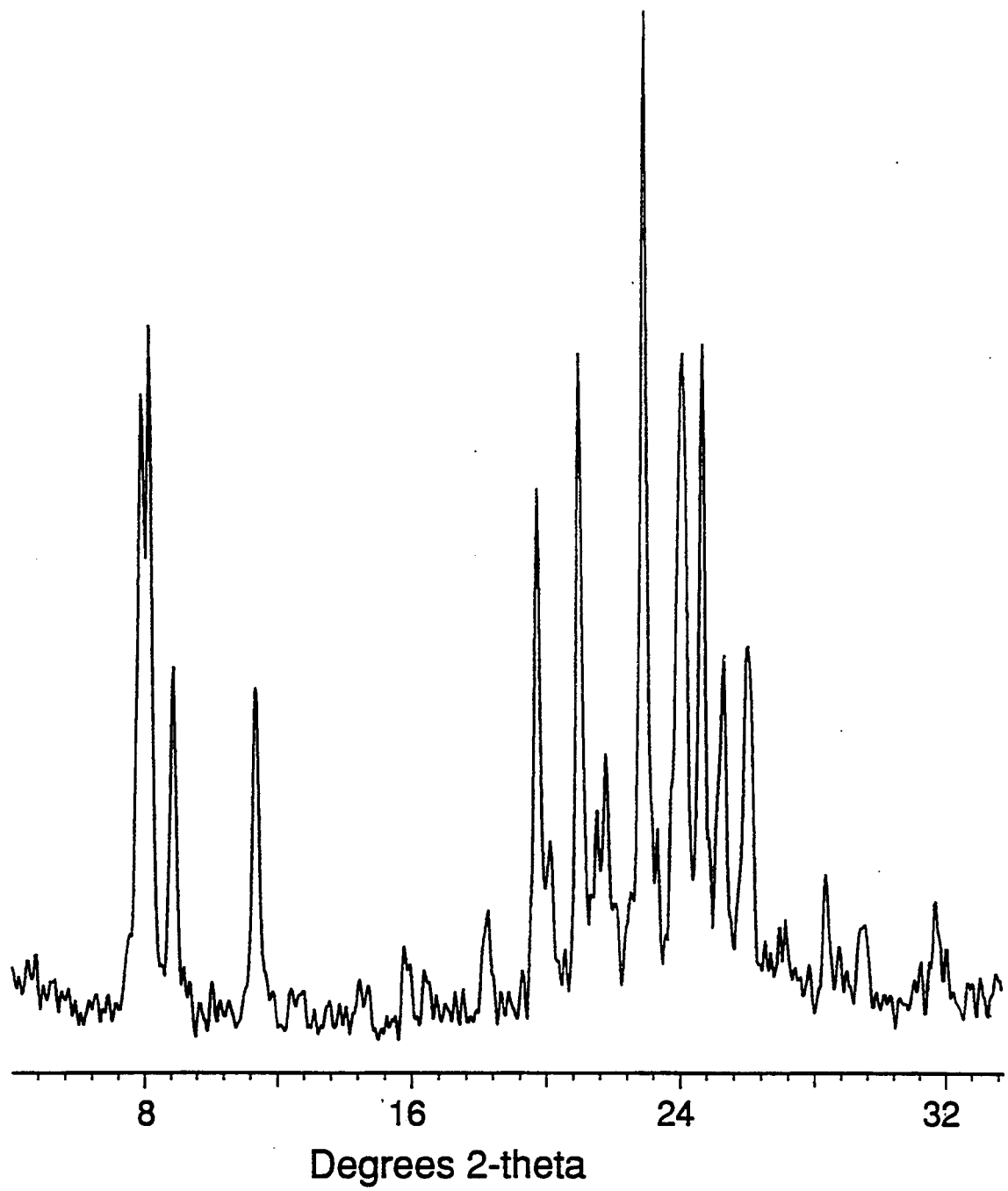
FIG. 1 presents the X-ray powder diffraction pattern of the product of Example 2, hereinafter presented.

The organic directing agent for use herein has a formula $C_{14}H_{36}N_3^{+++}$, and may be represented as follows:

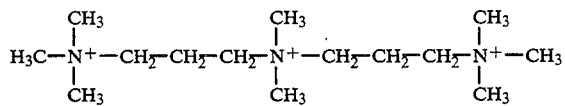

The source of the directing agent may be, for example, the halide (e.g., chloride or bromide) or hydroxide salt. The organic directing agent used in the following examples was synthesized as follows:

The neutral amine, iminobispropylamine ($H_2N(CH_2)_3NH(CH_2)_3NH_2$), obtained from BASF Corporation, was methylated by reaction with an excess of iodomethane. Since a by-product of this reaction is HI, stoichiometric amounts of sodium bicarbonate were used to neutralize the acid, thus preventing the subsequent protonation of the amine. In particular, iminobispropylamine (13.12 g, 0.1 moles) was mixed with about 500 mL absolute ethanol in a 2 L round-bottom flask. To this solution was added 42.02 g (0.50 moles) $NaHCO_3$. Iodomethane (171 g, 1.21 moles) was mixed with about 300 mL absolute ethanol and placed in an addition funnel. This solution was added dropwise to the former solution. During this addition, heating of the solution was initiated. Once the addition was completed, the mixture was heated to reflux temperature (77° C.), and held overnight. The reaction was stopped after 18 hours of refluxing. The solid product was filtered and washed with absolute ethanol. The product yield was 82.7%. Elemental analysis revealed 24.77% C (26.8% calc.), 6.10% N (6.70% calc.), and 6.12% H (5.74% calc.). The $^{13}C$ NMR shifts for this product appeared at 64.9, 63.7, 56.4, 54.0, and 20.1 ppm with a relative ratio of 1:1:3:1:3.

The particular effectiveness of the presently required organic directing agent, when compared with other directing agents, such as those identified above, for the present synthesis is believed due to its ability to function as a template in the nucleation and growth of ZSM-23 crystals from the above reaction mixture. This is true even though no predigestion of the gel is required prior to crystallization. This different organic agent functions in this fashion in the reaction mixture having the above described composition and under the above described conditions of temperature and time.

It should be noted that the ratio of components of the reaction mixture required herein are critical to achieve maximum effectiveness. For instance, if the $YO_2/X_2O_3$ ratio is greater than about 300, e.g, approaches infinity or the limits of current ability to measure and quantify high $YO_2/X_2O_3$ ratios, something other than ZSM-23 crystal will form.

The synthesis of the present invention is facilitated when the reaction mixture comprises seed crystals, such as those having the structure of ZSM-23. The use of at least 0.01%, preferably about 0.10%, and even more preferably about 1% seed crystals (based on total weight) of crystalline material will be useful.

The reaction mixture composition for the synthesis of ZSM-23 crystals hereby can be prepared utilizing materials which can supply the appropriate oxide. The useful sources of $X_2O_3$, e.g., aluminum oxide, iron oxide and/or boron oxide, include, as non-limiting examples, any known form of such oxide, e.g., aluminum oxide or hydroxide, organic or inorganic salt or compound, e.g., alumina, aluminates and borates. The useful sources of $YO_2$, e.g., silicon oxide, include, as non-limiting examples, known forms of such oxide, e.g., silicic acid or silicon dioxide, alkoxy- or other compounds of silicon, including silica gel and silica hydrosol.

It will be understood that each oxide component utilized in the reaction mixture for this synthesis can be supplied by one or more essential reactants and they can be mixed together in any order. For example, any oxide can be supplied by an aqueous solution. The reaction mixture can be prepared either batchwise or continuously. Crystal size and crystallization time for the product composition comprising the ZSM-23 crystals may vary somewhat with the exact nature of the reaction mixture employed within the above limitations.

The ZSM-23 crystal composition prepared hereby has a characteristic X-ray diffraction pattern, including values substantially as set forth in Table 1, hereinafter.

TABLE 1

| Interplanar d-Spacing, (A) | Relative Intensity (I/I$_o$) |
|---|---|
| 11.2 ± 0.23 | m |
| 10.1 ± 0.20 | w |
| 7.87 ± 0.15 | w |
| 5.59 ± 0.10 | w |
| 5.44 ± 0.10 | w |
| 4.90 ± 0.10 | w |
| 4.53 ± 0.10 | s |
| 3.90 ± 0.08 | vs |
| 3.72 ± 0.08 | vs |
| 3.62 ± 0.07 | vs |
| 3.54 ± 0.07 | m |
| 3.44 ± 0.07 | s |
| 3.36 ± 0.07 | w |
| 3.16 ± 0.07 | w |
| 3.05 ± 0.06 | w |
| 2.99 ± 0.06 | w |
| 2.85 ± 0.06 | w |
| 2.54 ± 0.05 | m |
| 2.47 ± 0.05 | w |
| 2.40 ± 0.05 | w |
| 2.34 ± 0.05 | w |

These X-ray diffraction data were collected with a Scintag theta-theta powder diffraction system, equipped with a graphite diffracted beam monochromator and scintillation counter, using copper K-alpha radiation. The diffraction data were recorded by step-scanning at 0.05 degrees of two-theta, where theta is the Bragg angle, and a counting time of 1 second for each step. The interplanar spacings, d's, were calculated in Angstron units (A), and the relative intensities of the lines, I/I$_o$, where I$_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols vs=very strong (75–100), s=strong (50–74), m=medium (25–49) and w=weak (0–24). It should be understood that diffraction data listed for this sample as single lines may consist of multiple overlapping lines which under certain conditions, such as differences in crystallite sizes or very high experimental resolution or crystallographic change, may appear as resolved or partially resolved lines. Typically, crystallographic changes can include minor changes in unit cell parameters and/or a change in crystal symmetry, without a change in topology of the structure. These minor effects, including changes in relative intensities, can also occur as a result of differences in cation content, framework composition, nature and degree of pore filling, and thermal and/or hydrothermal history.

The crystalline ZSM-23 prepared hereby has a composition involving the molar relationship:

$$X_2O_3:(y)YO_2$$

wherein X is a trivalent element, such as aluminum, boron, iron, indium and/or gallium, preferably aluminum; Y is a tetravalent element, such as silicon, tin and/or germanium, preferably silicon; and y is from about 30 to about 300, usually from about 45 to about 200. In the as-synthesized form, the crystalline material has a formula, on an anhydrous basis and in terms of moles of oxides per y moles of YO$_2$, as follows:

$$(0.05 \text{ to } 1.0)M_2O:(0.1 \text{ to } 4.0)R:X_2O_3: (y)YO_2$$

wherein M and R are as defined above. The M and R components are associated with the material as a result of their presence during crystallization, and are easily removed by post-crystallization methods hereinafter more particularly described.

Synthetic ZSM-23 crystals prepared in accordance herewith can be used either in the as-synthesized form, the hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to the ZSM-23 such as, for example, by, in the case of platinum, treating the material with a platinum metal-containing ion. Suitable platinum compounds for this purpose include chloroplatinic acid, platinous chloride and various compounds containing the platinum amine complex. Combinations of metals and methods for their introduction can also be used.

Synthetic ZSM-23 crystals, when employed either as an adsorbent or as a catalyst in a hydrocarbon conversion process, should be dehydrated at least partially. This can be done by heating to a temperature in the range of from about 65° C. to about 315° C. in an inert atmosphere, such as air, nitrogen, etc. and at atmospheric or subatmospheric pressures for between 1 and .48 hours. Dehydration can be performed at lower temperature merely by placing the zeolite in a vacuum, but a longer time is required to obtain a particular degree of dehydration. The thermal decomposition product of the newly synthesized ZSM-23 can be prepared by heating same at a temperature of from about 200° C. to about 550° C. for from 1 hour to about 48 hours.

The original cations, e.g., alkali metal, of the as-synthesized material can be replaced in accordance with techniques well known in the art, at least in part, by ion exchange with other cations. Preferred replacing cations include metal ions, hydrogen ions, hydrogen precursor, e.g., ammonium, ions and mixtures thereof. Particularly preferred cations are those which render the material catalytically active, especially for certain hydrocarbon conversion reactions. These include hydrogen, rare earth metals and metals of Groups IIA, IIIA, IVA, IB, IIB, IIIB, IVB, VIB, and VIII of the Periodic Table of the Elements.

Typical ion exchange technique would be to contact the synthetic ZSM-23 material with a salt of the desired replacing cation or cations. Examples of such salts include the halides, e.g., chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the ZSM-23 is then preferably washed with water and dried at a temperature ranging from 65° C. to about 315° C. and thereafter may be calcined in air or other inert gas at temperatures ranging from about 200° C. to about 550° C. for periods of time ranging from 1 to 48 hours or more to produce a catalytically-active thermal decomposition product thereof.

The crystalline ZSM-23 prepared by the instant invention is formed in a wide variety of particle sizes.

Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline material can be extruded before drying or dried or partially dried and then extruded.

In the case of many catalysts, it is desired to incorporate the crystals hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g., alumina, titania and/or zirconia. The latter may be either naturally occurring or in the form of gelatinous precipitates, sols or gels including mixtures of silica and metal oxides. Use of a material in conjuction with the ZSM-23, i.e., combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline catalytic materials have been incorporated into naturally occurring clays, e.g., bentonite and kaolin. These materials, i.e., clays, oxides, etc., function, in part, as binders for the catalyst. It is desirable to provide a catalyst having good crush strength because in a petroleum refinery the catalyst is often subjected to rough handling, which tends to break the catalyst down into powder-like materials which cause problems in processing.

Naturally occurring clays which can be composited with the hereby synthesized crystalline material include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present crystals can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used.

The relative proportions of finely divided crystalline material and matrix vary widely with the crystalline material content ranging from about 1 to about 90 percent by weight, and more usually in the range of about 2 to about 50 percent by weight of the composite.

Employing a catalytically active form of the catalyst of this invention which may contain additional hydrogenation components, reforming stocks can be reformed employing a temperature between about 370° C. and about 540° C. The pressure can be between about 100 psig and about 1000 psig, but it is preferably between about 200 psig and about 700 psig. The liquid hourly space velocity is generally between about 0.1 and about 10 hr$^{-1}$, preferably between about 0.5 and about 4 hr$^{-1}$, and the hydrogen to hydrocarbon mole ratio is generally between about 1 and about 20, preferably between about 4 and about 12.

The catalyst can also be used for hydroisomerization of normal paraffins, when provided with a hydrogenation component, e.g., platinum. Hydroisomerization is carried out at a temperature between about 90° C. and 375° C., preferably about 145° C. to about 290° C., with a liquid hourly space velocity between about 0.01 and about 2 hr$^{-1}$, preferably between about 0.25 and about 0.50 hr$^{-1}$, employing hydrogen such that the hydrogen to hydrocarbon mole ratio is between about 1:1 and about 5:1.

The catalyst can also be used for reducing the pour point of gas oils. This reaction may be conducted at a liquid hourly space velocity between about 10 and about 30 hr$^{-1}$ and at a temperature between about 400° C. and about 540° C.

Other reactions which can be accomplished employing the catalyst of this invention containing a metal, e.g., platinum, include hydrogenation-dehydrogenation reactions and desulfurization reactions.

EXAMPLES 1-6

In order to more fully illustrate the nature of the invention and the manner of practicing same, the following examples are presented.

In these examples, colloidal silica sol (30% $SiO_2$), a source of alumina, a source of M, the organic directing agent prepared as indicated above, and deionized water were mixed to form a hydrogel. The source of alumina in Example 3 was aluminum sulfate, i.e., $Al_2(SO_4)_3 \cdot 18-H_2O$. Sodium aluminate was the source of alumina in Examples 1, 2, 4 and 5. No alumina source was added to the reaction mixture for Example 6. When needed to adjust the $OH^-/SiO_2$ molar ratio in an example, sulfuric acid was used. M was $Na^+$ in Examples 1, 2 and 4-6 from NaOH(50%). M was $K^+$ in Example 3 from KOH(20%).

Crystallizations were conducted for each example in 300 mL Teflon-lined stainless-steel autoclaves equipped with stirrers. The sealed autoclave for each example was heated at a ramp rate of 2° C./minute to the desired crystallization temperature.

At the conclusion of each reaction, the mixture was allowed to cool, and the product was recovered by filtering and washing with a large amount of distilled deionized water. The washed product was then dried under an infrared heat lamp in a stream of air. Only the product of Example 3 was not 100% crystalline.

After drying, the product of each example was submitted for X-ray powder diffraction, NMR and chemical analysis. Solution $^{13}C$ NMR data were obtained on a 200 MHz spectrometer using the 10 mm C/H dual liquids probe. The spectra were measured at 50.18 MHz using 18 Hz spinning, 10 μs (50°) pulses, and a 3 second pulse delay.

Reaction mixture compositions, reaction conditions and product results are listed in Table 2. FIG. 1 presents the X-ray diffraction pattern for the product of Example 2, showing it to comprise the structure of ZSM-23. Table 3 presents the X-ray diffraction data for the Example 2 product.

TABLE 2

| Example | SiO2/Al2O3 | H2O/SiO2 | OH−/SiO2 | M/SiO2 | R/SiO2 | Time (hr) | Temp. (°C.) | Products |
|---|---|---|---|---|---|---|---|---|
| 1 | 45 | 60 | 0.26 | 0.31 | 0.08 | 96 | 170 | ZSM-23 |
| 2 | 90 | 60 | 0.26 | 0.28 | 0.08 | 96 | 170 | ZSM-23 |
| 3 | 90 | 60 | 0.25 | 0.27 | 0.08 | 96 | 170 | ZSM-23 |
| 4 | 90 | 30 | 0.25 | 0.27 | 0.08 | 120 | 170 | ZSM-23 |
| 5 | 180 | 60 | 0.27 | 0.28 | 0.08 | 72 | 170 | ZSM-23 |
| 6 | ∞ | 60 | 0.28 | 0.28 | 0.08 | 72 | 170 | ZSM-48 |

TABLE 3

| Interplanar d-Spacing (A) | Degrees 2-theta | Relative Intensity |
|---|---|---|
| 11.4013 | 7.754 | 18.5 |
| 11.2143 | 7.884 | 50.0 |
| 11.0944 | 7.969 | 35.2 |
| 10.8408 | 8.156 | 72.2 |
| 10.1273 | 8.731 | 13.0 |
| 9.9534 | 8.884 | 40.7 |
| 7.8245 | 11.308 | 20.4 |
| 7.7659 | 11.394 | 25.9 |
| 4.8648 | 18.236 | 7.4 |
| 4.5083 | 19.691 | 59.3 |
| 4.4432 | 19.983 | 9.3 |
| 4.4155 | 20.110 | 11.1 |
| 4.2429 | 20.937 | 61.1 |
| 4.2219 | 21.042 | 13.0 |
| 4.1373 | 21.477 | 18.5 |
| 4.1081 | 21.632 | 7.4 |
| 4.0860 | 21.750 | 20.4 |
| 4.0268 | 22.074 | 7.4 |
| 3.9063 | 22.764 | 22.2 |
| 3.8862 | 22.883 | 100.0 |
| 3.8500 | 23.101 | 9.3 |
| 3.8193 | 23.290 | 14.8 |
| 3.7484 | 23.736 | 13.0 |
| 3.7124 | 23.970 | 51.9 |
| 3.6923 | 24.102 | 33.3 |
| 3.6374 | 24.472 | 9.3 |
| 3.6148 | 24.627 | 66.7 |
| 3.5830 | 24.850 | 7.4 |
| 3.5542 | 25.054 | 14.8 |
| 3.5384 | 25.168 | 14.8 |
| 3.5228 | 25.281 | 33.3 |
| 4.4697 | 25.674 | 7.4 |
| 3.4371 | 25.922 | 27.8 |
| 3.4197 | 26.056 | 22.2 |

These examples demonstrate the present invention of synthesizing crystals having the structure of ZSM-23 from the required reaction mixture.

Changes and modifications in the specifically described embodiments can be carried out without departing from the scope of the invention which is intended to be limited only by the scope of the appended claims.

What is claimed is:

1. A method for synthesizing crystalline material exhibiting a characteristic X-ray diffraction pattern including d-spacing maxima values as shown in Table 1, which comprises (i) preparing a mixture capable of forming said material, said mixture comprising sources of alkali or alkaline earth metal (M), an oxide of trivalent element (X), an oxide of tetravalent element (Y), water and directing agent (R) of the formula $(CH_3)_3N^+CH_2CH_2CH_2N^+(CH_3)_2CH_2CH_2CH_2N^+(CH_3)_3$, and having a composition, in terms of mole ratios, within the following ranges;

| | |
|---|---|
| $YO_2/X_2O_3$ | 30 to 300 |
| $H_2O/YO_2$ | 20 to 100 |
| $OH^-/YO_2$ | 0.1 to 0.4 |
| $M/YO_2$ | 0.05 to 1.0 |
| $R/YO_2$ | 0.02 to 1.0 |

(ii) maintaining said mixture under sufficient conditions including a temperature of from about 150° C. to about 190° C. until crystals of said material are formed; and
(iii) recovering said crystalline material from step (ii), said recovered crystalline material containing said R.

2. The method of claim 1 wherein said mixture has the following composition ranges:

| | |
|---|---|
| $YO_2/X_2O_3$ | 45 to 200 |
| $H_2O/YO_2$ | 40 to 70 |
| $OH^-/YO_2$ | 0.25 to 0.35 |
| $M/YO_2$ | 0.2 to 0.6 |
| $R/YO_2$ | 0.05 to 0.15 |

3. The method of claim 1 wherein said mixture further comprises seed crystals in sufficient amount to enhance synthesis of said crystalline material.

4. The method of claim 3 wherein said seed crystals have the structure of ZSM-23.

5. The method of claim 1 wherein said X is aluminum, boron, iron, gallium, indium or a mixture thereof, and said Y is silicon, germanium, tin or a mixture thereof.

6. The method of claim 1 wherein X comprises aluminum and Y comprises silicon.

7. A mixture capable of forming crystals of ZSM-23 structure upon crystallization, said mixture comprising sources of alkali or alkaline earth metal (M), trivalent element (X) oxide selected from the group consisting of oxide of aluminum, boron, iron, gallium, indium and mixtures thereof; tetravalent element (Y) oxide selected from the group consisting of oxide of silicon, germanium, tin and mixtures thereof; water and directing agent (R) of the formula $(CH_3)_3N^+CH_2CH_2CH_2N^+(CH_3)_2CH_2CH_2CH_2N^+(CH_3)_3$, and having a composition, in terms of mole ratios, within the following ranges:

| | |
|---|---|
| $YO_2/X_2O_3$ | 30 to 300 |
| $H_2O/YO_2$ | 20 to 100 |
| $OH^-/YO_2$ | 0.1 to 0.4 |
| $M/YO_2$ | 0.05 to 1.0 |
| $R/YO_2$ | 0.02 to 1.0 |

8. The method of claim 1 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

9. The method of claim 2 comprising replacing ions of the crystalline material recovered in step (iii), at least in part, by ion exchange with an ion or a mixture of ions selected from the group consisting of hydrogen and hydrogen precursors, rare earth metals and metals from Groups IIA, IIIA, IVA, IB, IIB, IIIB, IVB, VIB and VIII of the Periodic Table of Elements.

10. The method of claim 8 wherein said replacing ion is hydrogen or a hydrogen precursor.

11. The method of claim 9 wherein said replacing ion is hydrogen or a hydrogen precursor.

12. A recovered crystalline material made by the method of claim 1.

13. A recovered crystalline material made by the method of claim 2.

14. An R-containing product crystalline material made by the method of claim 8.

15. An R-containing product crystalline material made by the method of claim 9.

16. An R-containing product crystalline material made by the method of claim 10.

17. An R-containing product crystalline material made by the method of claim 11.

* * * * *

UNITED STATES PATENT AND TRADEMARK OFFICE
CERTIFICATE OF CORRECTION

PATENT NO. : 5,332,566
DATED : July 26, 1994
INVENTOR(S) : A. Moini

It is certified that error appears in the above-indentified patent and that said Letters Patent is hereby corrected as shown below:

Col. 10, line 49, Claim 7, in the formula, "$N^{30}$" should be -- $N^+$ --.

Signed and Sealed this

Twenty-second Day of November, 1994

Attest:

BRUCE LEHMAN

Attesting Officer     Commissioner of Patents and Trademarks